Figure 1:
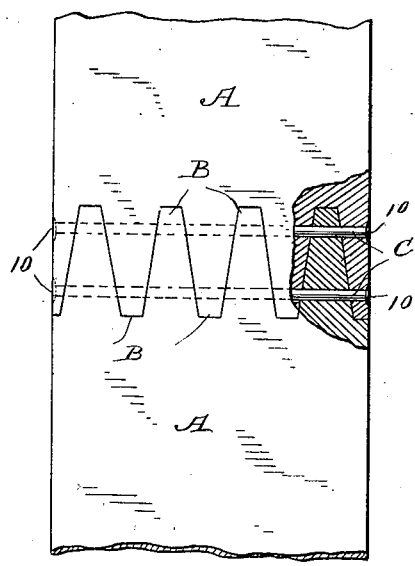

No. 663,967. Patented Dec. 18, 1900.
H. HUBBELL.
BELT FASTENING.
(Application filed Feb. 24, 1900.)

(No Model.)

WITNESSES
H. A. Lamb
S. H. Atherton.

INVENTOR
Harvey Hubbell
By A. M. Wooster
Atty.

UNITED STATES PATENT OFFICE.

HARVEY HUBBELL, OF BRIDGEPORT, CONNECTICUT.

BELT-FASTENING.

SPECIFICATION forming part of Letters Patent No. 663,967, dated December 18, 1900.

Application filed February 24, 1900. Serial No. 6,327. (No model.)

*To all whom it may concern:*

Be it known that I, HARVEY HUBBELL, a citizen of the United States, residing at Bridgeport, county of Fairfield, State of Connecticut, have invented a new and useful Belt-Fastening, of which the following is a specification.

My invention has for its object to provide a simple, inexpensive, durable, and easily-applied fastening for the end of leather belts that will give the necessary strength in connection with perfect flexibility of the belt, will avoid paring and lapping the ends of the belt, will do away with all lacings and clips, and will, furthermore, avoid metallic contact with the pulleys, thus avoiding the loss of time required in threading all styles of lacings and avoiding the slipping upon the pulleys of smooth metallic fastenings, the injury to pulleys of rough metallic fastenings, and the unequal wear of belt and fastening which is inseparable from the use of all metallic fastenings, an important advantage of my novel fastening being that the contact with the pulley and the wear upon the belt are the same at the fastening as at all other portions of the belt.

With these ends in view I have devised the novel belt-fastening which I will now describe, referring to the accompanying drawings, forming part of this specification, and using reference characters to designate the several parts.

Figure 2:
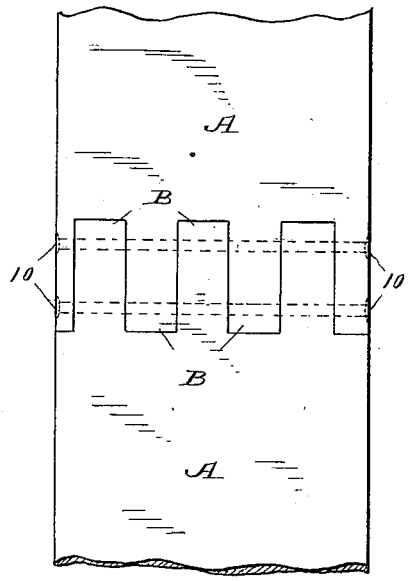
Figure 3:
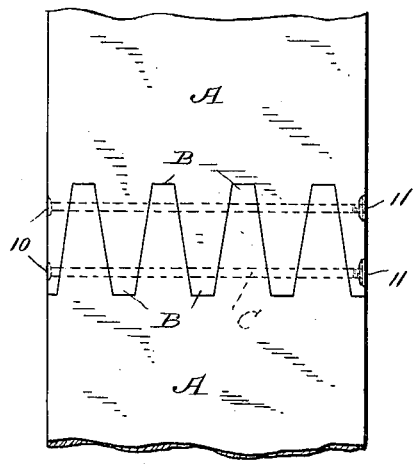

Figures 1, 2, and 3 are plan views illustrating belt ends joined by my novel fastening, Fig. 1 being broken away to show the rods, Fig. 2 illustrating a slightly different style of interlocking projections on the belt ends, and Fig. 3 illustrating a slightly different mode of retaining the rods in place.

A denotes belt ends which are provided with corresponding projections B, adapted to interlock, as clearly shown in the several figures of the drawings. The special shape or design of these interlocking projections is wholly immaterial, it being simply required that the projections on the respective belt ends correspond so that they will interlock. I have shown two forms of projections in the drawings which is deemed quite sufficient for the purposes of this specification. An essential feature of my invention, however, is that the projections are the full thickness of the belt—that is to say, that they are not pared down or reduced in thickness, as they do not overlap in the fastening position. In practice a special cutter to form the projections at the belt ends is provided. This cutter, however, is not of the essence of my invention, as it is wholly immaterial, so far as my invention is concerned, how the projections are formed. The interlocking projections are locked together in the assembled position by means of transverse rods C, which extend through the belt from side to side on opposite sides of the mid-length of the projections. In practice I do not remove any of the belt by cutting, but form holes for the rods with an awl. In Figs. 1 and 2 I have shown the rods as headed at both ends, as at 10, and in Fig. 3 have shown the rods as threaded at one end and as retained in position by nuts 11.

The operation of joining belt ends by means of my novel fastening is too obvious to require description in detail. It is sufficient to say that corresponding interlocking projections are formed in any suitable manner upon both ends of the belt. Holes may be made transversely in the horizontal plane through the interlocking projections and rods are passed through said projections and headed or otherwise secured upon the edges of the belt, so that in practice both the pulley and outer sides of the belt show no metal whatever, the only metal visible in the fastening being the ends of the rods at the edges of the belt. Owing to the fact that the interlocking projections of the belt ends are secured edge to edge and so that their inner surfaces are all in the same plane with each other and with the inner surface of the belt proper and their outer surfaces all in the same plane with each other and with the outer surface of the belt proper, perfectly flat wearing portions are provided at the joint. This results in leaving the joint portion as thoroughly efficient as the main portion of the belt, there being no metallic or other fastenings to interfere with the grip of the belt at the joint upon the pulleys or belt-wheels. The two rods 10 10 are passed through the projections on opposite sides of the mid-length thereof, and therefore insure the proper curving of said projections as the belt passes around the pulley, said rods preventing the tips of the projections from springing out of their positions in the same plane with the bases of the opposite projections. The sides of said projections closely fit each other, as shown in the drawings, and the rods 10 serve to bind the sides of the said projections together and prevent the sides from wearing each other in use.

Having thus described my invention, I claim—

The combination with the ends of a belt provided with close-fitting interlocking projections the inner and outer surfaces of which are in the same plane with the inner and outer surfaces of the belt to present flat wearing portions, the sides of said projections being in close contact with each other throughout, and transverse rods passing through said projections on opposite sides of the midlength thereof, the said rods coacting with each other and with the close-fitting sides of the projections to prevent rubbing movement between said sides.

In testimony whereof I affix my signature in presence of two witnesses.

HARVEY HUBBELL.

Witnesses:
A. M. WOOSTER,
S. W. ATHERTON.